UNITED STATES PATENT OFFICE.

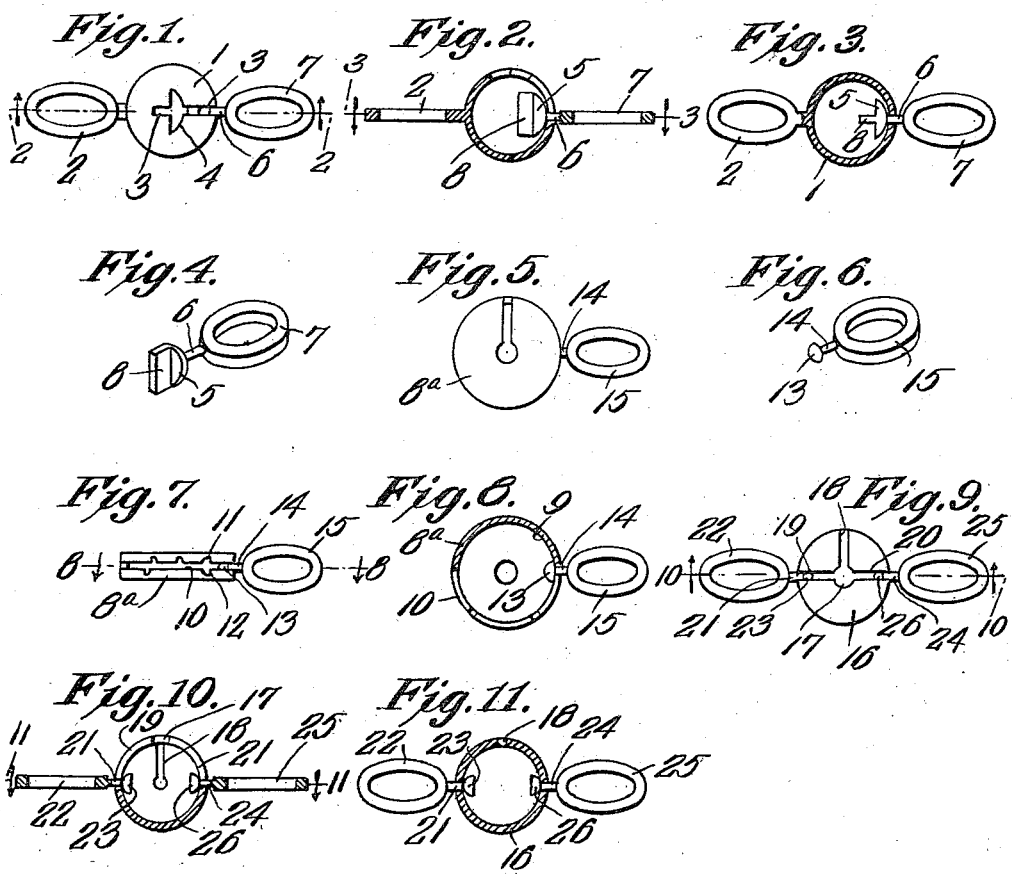

WILLIAM A. HARTLINE, OF PENNS GROVE, NEW JERSEY.

FASTENING DEVICE.

1,265,778.

Specification of Letters Patent.  Patented May 14, 1918.

Application filed November 22, 1917. Serial No. 203,408.

*To all whom it may concern:*

Be it known that WILLIAM A. HARTLINE, a citizen of the United States, residing at Penns Grove, in the county of Salem and State of New Jersey, has invented certain new and useful Improvements in Fastening Devices, of which the following is a specification.

This invention relates to fastening devices, and more particularly to a fastening device especially adapted for use in connection with watch chains and similar structures.

One of the main objects of the invention is to provide a device of the character stated which may be produced at relatively low cost and is composed of a minimum of parts. A further object is to provide a fastening device so constructed as to effectually prevent accidental unfastening of the same. Further objects will appear from the detailed description.

In the drawings:—

Figure 1 is a top plan view of the preferred form of a fastening device constructed in accordance with my invention, Fig. 2 is a section on line 2—2 of Fig. 1, Fig. 3 is a section on line 3—3 of Fig. 1, Fig. 4 is a detail perspective of the link and the securing head carried thereby, Fig. 5 is a top plan view of a modified form, Fig. 6 is a perspective detail of the link and fastening head carried thereby used in Fig. 5, Fig. 7 is a side view of the form illustrated in Fig. 5, Fig. 8 is a section taken substantially on line 8—8 of Fig. 7, Fig. 9 is a top plan view of another modified form especially adapted for use with vest chains having 3 points of connection, Fig. 10 is a section on line 10—10 of Fig. 9, Fig. 11 is a section on line 11—11 of Fig. 10.

The numeral 1 designates a hollow ball to which is fixedly secured a link 2. This ball is provided with a slot 3 which extends approximately one-third of the distance around the ball. This slot is provided, adjacent one end, with the sectoral enlargement 4 communicating therewith. The enlargement 4 is adapted to receive the frusto-spherical securing head 5 carried by a shank 6 formed integral with a link 7. This head is provided on its plane face with a longitudinally extending rib 8. This rib corresponds in height to the length of the shorter portion of the slot 3 adjacent the opening 4. By turning the head 5 so as to bring one end of the rib 8 into register with the end portion of slot 3, the head and rib may be readily inserted into the ball through the end portion of the slot and the opening 4, the shank 6 of link 7 passing through slot 3. By turning the shank through 90 degrees after thus inserting the securing head, so as to move the rib 8 into a plane extending substantially at a right angle to the plane of slot 3, accidental removal of the securing head 5 from the ball will be eliminated. By this means, the link 7 may be quickly and easily secured to the ball and, when desired, may be as quickly and easily removed, accidental removal of the link being effectually prevented.

In the form illustrated in Figs. 5 to 8 inclusive, the ball 1 is replaced by a disk $8^a$. This disk is of hollow construction having the central chamber 9, and is provided with a peripheral slot 10 extending approximately one-half the distance around the disk. This slot has the oppositely disposed alined notches 11 and 12 which coöperate with the body of the slot to form an opening for receiving the securing head 13 carried by shank 14 formed integral with the link 15. The shank 14 is of such size as to be freely movable through slot 10, the head 13 being, of course, of considerably greater diameter than shank 14. By inserting head 13 through the opening provided by the notches 11 and 12 and slot 10, and then moving the link about the disk, the link is secured to the disk. As it is necessary to tilt the head 13 at an angle to the body of the disk so as to permit removal of the same through the notches 11 and 12, it will be evident that accidental detachment of the head from the disk is eliminated.

In Figs. 9 to 11 inclusive, I have illustrated a form of attaching means especially adapted for use in connection with vest chains where 3 points of attachment are desired. For this purpose, the hollow ball 16 is provided with an enlarged central opening 17 from which radiate the 3 slots 18, 19, and 20. Slot 19 receives the shank 21 integral with link 22 provided on its inner end with the enlarged head 23 which is of such size as to be insertible through the central opening 17. Slot 20 receives a shank 24 formed integral with link 25 and provided on its inner end with the head 26 similar to head 23. If desired, a third link may be similarly secured to the ball 16 by means of a shank operable in slot 18 and having an enlarged head on its inner end. By this means, I provide a securing device of simple construction having 3 points of attachment which is well adapted to use in connection with vest chains and similar devices.

What I claim is:—

1. In securing means, a hollow member having a slot and an enlarged opening communicating therewith, a link having an integral shank operable in the slot of said member and a securing head carried thereby corresponding in size to the said enlarged opening and provided with an integral rib insertible into the hollow member through said slot.

2. In fastening means, a hollow member having a slot and an enlarged sectoral opening communicating therewith, and a link having an integral shank operable in said slot and provided with a frusto-spherical head insertible through the said enlarged opening and provided on its plane face with an integral rib insertible through said slot into the hollow member.

In testimony whereof I affix my signature in presence of two witnesses.

WILLIAM A. HARTLINE.

Witnesses:
M. E. JONES,
JESSIE W. BOHRER.

Copies of this patent may be obtained for five cents each, by addressing the "Commissioner of Patents, Washington, D. C."